US012812605B2

(12) United States Patent
Mu

(10) Patent No.: US 12,812,605 B2
(45) Date of Patent: Nov. 24, 2026

(54) BANDWIDTH PART SWITCHING METHOD, AND COMMUNICATION DEVICE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 410 days.

(21) Appl. No.: 18/275,371

(22) PCT Filed: Feb. 2, 2021

(86) PCT No.: PCT/CN2021/074924
§ 371 (c)(1),
(2) Date: Aug. 1, 2023

(87) PCT Pub. No.: WO2022/165646
PCT Pub. Date: Aug. 11, 2022

(65) Prior Publication Data
US 2024/0073870 A1 Feb. 29, 2024

(51) Int. Cl.
*H04W 72/04* (2023.01)
*H04L 5/00* (2006.01)

(52) U.S. Cl.
CPC ........... *H04W 72/04* (2013.01); *H04L 5/0092* (2013.01)

(58) Field of Classification Search
CPC ............. H04W 72/04; H04W 72/0453; H04W 72/232; H04L 5/0092; H04L 5/0005; H04L 5/0078; H04L 5/0098; H04L 27/26025
USPC .......................................................... 370/329
See application file for complete search history.

(56) References Cited

U.S. PATENT DOCUMENTS

2019/0215869 A1 7/2019 Lin
2020/0351738 A1 11/2020 Huang et al.
2021/0014010 A1 1/2021 Babaei et al.
2021/0051631 A1* 2/2021 Deogun ................ H04L 5/0098
2022/0038322 A1* 2/2022 Ly ....................... H04L 27/2614
2022/0116946 A1* 4/2022 Yang ..................... H04L 1/1812
2022/0231818 A1* 7/2022 Lee ....................... H04L 5/0098
2022/0248411 A1* 8/2022 Jung ........................ H04B 7/06
2022/0369351 A1* 11/2022 Sakhnini ............... H04L 5/0098
2023/0247614 A1* 8/2023 Li ..................... H04W 72/0453 370/329
2023/0396403 A1* 12/2023 Xu ........................ H04L 5/0091
2024/0015556 A1* 1/2024 Lei ........................ H04W 24/10

FOREIGN PATENT DOCUMENTS

CN 110536444 A 12/2019

OTHER PUBLICATIONS

Chinese Patent Application No. 202310317761.9, Office Action dated Feb. 2, 2024, 8 pages.

(Continued)

*Primary Examiner* — Jutai Kao
*Assistant Examiner* — Syed M Bokhari
(74) *Attorney, Agent, or Firm* — Cozen O'Connor

(57) ABSTRACT

A method for bandwidth part (BWP) switching includes: switching from a source BWP to a target BWP using a first switching mode or a second switching mode, in which, a switching delay used by the first switching mode is longer than a switching delay used by the second switching mode.

20 Claims, 3 Drawing Sheets

(56) References Cited

OTHER PUBLICATIONS

Chinese Patent Application No. 202310317761.9, English translation of Office Action dated Feb. 2, 2024, 8 pages.
Huawei, et al. "R4-1807350 CR on TS38.133 for BWP switching delay" 3GPP TSG-RAN WG4 Meeting #87, R4-1807350, May 2018, 3 pages.
Mediatek "CR on updating requirement for BWP switching delay in TS38.133" 3GPP TSG-RAN WG4 Meeting #8, R4-1810023, Aug. 2018, 3 pages.
European Patent Application No. 21923675.9, Search Report and Opinion dated Oct. 10, 2024, 5 pages.
Indian Patent Application No. 202347055282, Office Action dated Apr. 16, 2026, 7 pages.
PCT/CN2021/074924, International Search Report dated Oct. 26, 2021, 2 pages.

* cited by examiner

BANDWIDTH PART SWITCHING METHOD, AND COMMUNICATION DEVICE

CROSS-REFERENCE TO RELATED APPLICATION

This application is a U.S. national phase of International Application No. PCT/CN2021/074924, filed on Feb. 2, 2021, the entire content of which is incorporated herein by reference.

TECHNICAL FIELD

The disclosure relates to a field of wireless communication technology, in particular to a method for bandwidth part (BWP) switching and a communication device.

BACKGROUND

In a wireless communication system, due to the limited receiving capability of a reduced capability (redcap) terminal, its transmitting and receiving bandwidth is only 20 MHz in the case of frequency range (FR) 1 and 40 MHz in the case of FR2. Therefore, when configuring the BWP, the network device may configure a BWP that is less than or equal to a size of its transmitting and receiving bandwidth for the Redcap terminal.

SUMMARY

According to a first aspect of the embodiments of the disclosure, a method for bandwidth part (BWP) switching, performed by a terminal device, is provided. The method includes: switching from a source BWP to a target BWP using a first switching mode or a second switching mode; in which, a switching delay used by the first switching mode is longer than a switching delay used by the second switching mode.

According to a second aspect of the embodiments of the disclosure, a method for BWP switching, performed by a network device, is provided. The method includes: configuring a plurality of BWPs for a terminal device, in which, in the plurality of BWPs, switching from a source BWP to a target BWP is based on a first switching mode or a second switching mode, and a switching delay used by the first switching mode is longer than a switching delay used by the second switching mode.

According to a third aspect of the embodiments of the disclosure, a communication device is provided. The communication device includes a transceiver, a memory and a processor connected to the transceiver and the memory respectively. The processor is configured to control transmission and reception of radio signals of the transceiver by executing computer-executable instructions on the memory, and is capable of implementing the method for BWP switching of the first aspect of the embodiments of the disclosure or the method for BWP switching of the second aspect of the embodiments of the disclosure.

Additional aspects and advantages of embodiments of disclosure will be given in part in the following descriptions, become apparent in part from the following descriptions, or be learned from the practice of the embodiments of the disclosure.

BRIEF DESCRIPTION OF THE DRAWINGS

The above and/or additional aspects and advantages of the disclosure will become apparent and more readily appreciated from the following descriptions of the embodiments made with reference to the accompanying drawings, in which.

DETAILED DESCRIPTION

Figure 1:
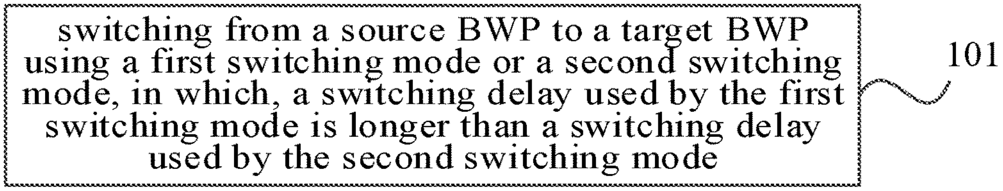
FIG. 1 is a flowchart of a method for bandwidth part (BWP) switching performed by a terminal device according to an embodiment of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in this disclosure are used solely for the purpose of describing particular embodiments and are not intended to limit this disclosure. The singular forms "a" and "the" as used in this disclosure and in the appended claims are also intended to encompass the plural forms, unless the context clearly indicates otherwise. It should also be understood that the term "and/or" as used herein refers to and encompasses any or all possible combinations of one or more of the associated listed items.

It should be understood that while the terms first, second, third, etc. may be employed in embodiments of the disclosure to describe various types of information, such information should not be limited to these terms. These terms are only used to distinguish the same type of information from one another. For example, without departing from the scope of embodiments of the disclosure, first information may also be referred to as second information, and similarly, second information may be referred to as first information. Depending on the context, the terms "in response to" and "if" as used herein may be interpreted as "when" or "while" or "in response to determining".

The embodiments of the disclosure are described in detail below, and examples of which are illustrated in the accompanying drawings, in which the same or similar symbols throughout indicate the same or similar elements. The embodiments described below by reference to the accompanying drawings are exemplary and are intended to be used to explain the disclosure and are not to be construed as limiting the disclosure.

Before specifically explaining the embodiments of the disclosure, common technical terms are first introduced for ease of understanding.

Reduced capability (Redcap) use terminal (UE): the machine type communication (MTC) technology and the narrow band Internet of Things (NB-IoT) technology are proposed in communication systems, such as a long term evolution (LTE) 4G (the fourth mobile communication technology) system, to support Internet of Things (IoT) services. These two technologies are mainly focusing on low-rate and high-latency scenarios, such as meter reading, environmental monitoring, and other scenarios. The NB-IoT technology currently supports a maximum transmission rate of several hundred kbps (kilo bits per second), while the MTC technology currently supports a maximum transmission rate of several Mbps (million bits per second). However, with the continuous development of IoT services, such as population of services such as video monitoring, smart home, wearable devices and industrial sensing monitoring, these services usually require a transmission rate ranging from tens of Mbps to 100 Mbps, and the above services also have relatively high requirements for latency, thus the MTC technology and the NB-IoT technology in the LTE can hardly satisfy the requirements of the above services. Based on this case, designing a new UE in the 5G new radio (NR) is proposed to cover the requirements of such mid-end IoT devices. In the current 3rd Generation Partnership Project (3GPP) specifications, this new terminal type is called a Redcap UE or simply referred to as NR-lite.

Meanwhile, on the other hand, similar to IoT devices in the LTE, 5G-based NR-lite UEs usually need to fulfill the requirements of low cost, low complexity, some degree of coverage enhancement, and power saving.

Coverage enhancement: for a Redcap UE, coverage enhancement is required due to the reduction of UE capabilities, such as the reduction of the number of the receiving antennas, which brings about coverage loss. In this case, coverage enhancement is carried out by means of repeated transmissions, i.e., the data of the UE is transmitted repeatedly for many times.

Due to factors such as the limited receiving capability of the Redcap UE, its transmitting and receiving bandwidth is only 20 MHz in the case of frequency range (FR)1 and 40 MHz in the case of FR2. Therefore, when configuring a bandwidth part (BWP), the network device may configure the Redcap UE with a BWP that is less than or equal to the size of its transmitting and receiving bandwidth.

However, due to the small transmitting and receiving bandwidth of the Redcap UE, especially in the case of FR1, it is difficult to obtain a relatively good frequency selective gain and frequency diversity gain in a small BWP.

Moreover, the terminal device may configure a plurality of BWPs to obtain the frequency diversity gain or the frequency selective gain. Due to different configuration parameters of each BWP, there is a switching delay when switching between different BWPs. For example, the BWP switching delay can be shown in Table 1.

TABLE 1

| μ | NR slot length (ms) | Interruption length (number of slots) |
|---|---|---|
| 0 | 1 | 1 |
| 1 | 0.5 | 1 |
| 2 | 0.25 | 3 |
| 3 | 0.125 | 5 |

The magnitude of the switching delay is measured in slots and is related to the capability of a terminal device, and μ is related to a value of a subcarrier spacing (SCS). If BWP switching involves a change in SCS, the BWP switching delay can be determined by a larger delay from a SCS before switching and a SCS after switching. For example, a SCS of a BWP before the switching is 60 KHz (μ=2) and a SCS of a BWP after the switching is 15 KHz (μ=0), and it can be determined based on Table 1 that, a switching delay when μ=2 is 0.25×3 ms (milliseconds) (with a corresponding interruption length of interruption slots), and a switching delay when μ=0 is 1×1 ms (with a corresponding interruption length of 1 interruption slot), then the switching delay of this BWP switching is 1 ms.

If the Redcap UE is to obtain the frequency diversity gain or the frequency selective gain, it can realize it only by BWP switching. However, the switching delay of BWP switching is relatively long, which leads to a long interruption duration in Redcap communication. In addition, during BWP switching, the (hybrid automatic repeat request) HARQ feedback and non-scheduled transmission such as the transmission of configured grant are also interrupted. Currently, Redcap UEs can use one switching method for BWP switching. In some scenarios, it may not be able to meet the needs of services with relatively high requirements for latency.

In view of the above problems, the disclosure provides a method for BWP switching, an apparatus for BWP switching and a communication device.

FIG. 1 is a flowchart of a method for BWP switching provided by an embodiment of the disclosure. The method is performed by a terminal device.

The terminal device may be a device that provides voice and/or data connectivity to a user, a handheld device with a wireless connection function, or other processing devices connected to a wireless modem, and the like. The name of the terminal device may be different in different systems. For example, in the 5G system, the terminal device may be called a UE. A wireless terminal device may communicate with one or more core networks (CNs) via a radio access network (RAN). The wireless terminal device may be a mobile terminal device, such as a cell phone (or "cellular" phone) and a computer having a mobile terminal device. The wireless terminal device may also be a portable, pocket-sized, handheld, computer-built in, or a vehicle-mounted mobile device that exchanges language and/or data with the RAN.

For example, the terminal device can be a personal communication service (PCS) phone, a cordless phone, a session initiated protocol (SIP) phone, a wireless local loop (WLL) station, a personal digital assistant (PDA) and other devices. The wireless terminal device can also be called a system, a subscriber unit, a subscriber station, a mobile station, a mobile, a remote station, an access point, a remote terminal, an access terminal, a user terminal, a user agent, and a user device, which is not limited in the embodiments of the disclosure.

As shown in FIG. 1, the method for BWP switching includes the following steps.

At step 101, switching from a source BWP to a target BWP is performed using a first switching mode or a second switching mode.

That is, a set of candidate switching modes is provided in the embodiments of the disclosure. The set of candidate switching modes at least includes a first switching mode and a second switching mode. A switching mode is determined from the set of candidate switching modes for switching from the source BWP to the target BWP according to the switching mode.

That is, in the embodiments of the disclosure, the mode in which the terminal device performs BWP switching is configurable. In some embodiments, the mode of BWP switching may be determined based on a communication standard, configured based on a network side configuration, or determined based on a preset switching configuration parameter.

A switching delay used by the first switching mode is longer than a switching delay used by the second switching mode.

In the embodiment of the disclosure, the source BWP is a BWP used for data transmission with the network device before the switching.

In the embodiment of the disclosure, the target BWP is a BWP adopted for data transmission with the network device after the switching.

In the embodiments of the disclosure, the switching delay used by the first switching mode is longer than the switching delay used by the second switching mode. For example, the switching delay used by the first switching mode is referred to as a first switching delay, and the switching delay used by the second switching mode is referred to as a second switching delay, the first switching delay is longer than the second switching delay, or the second switching delay is shorter than the first switching delay.

As a possible implementation of the disclosure, the switching delay used by the first switching mode, i.e., the first switching delay, may have a plurality of candidate values, and the plurality of candidate values correspond to different SCSs. For example, the switching delay used by the first switching mode, i.e., the first switching delay, may be as shown in Table 1, and the candidate values corresponding to the first switching delay used by the first switching mode may be 1 ms, 0.5 ms, 0.25 ms, and 0.125 ms.

As a possible implementation, when a SCS of the source BWP is different from a SCS of the target BWP, a larger value from a candidate value corresponding to the SCS of the source BWP and a candidate value corresponding to the SCS of the target BWP may be determined as the first switching delay used by the first switching mode. That is, in the first switching mode, in response to the SCS of the source BWP being different from the SCS of the target BWP, the larger value from the candidate value corresponding to the SCS of the source BWP and the candidate value corresponding to the SCS of the target BWP is determined as the first switching delay used by the first switching mode.

For example, when the SCS of the source BWP is 60 KHz ($\mu$=2) and the SCS of the target BWP is 15 KHz ($\mu$=0), as can be seen in Table 1, the candidate value corresponding to the SCS of the source BWP, i.e., the corresponding candidate value when $\mu$=2, is 0.25 ms, and the candidate value corresponding to the SCS of the target BWP, i.e., the corresponding candidate value when $\mu$=0, is 1 ms. Then, the first switching delay used by the first switching mode can be 1 ms.

As a possible implementation, when the SCS of the source BWP is identical to the SCS of the target BWP, a candidate value corresponding to the SCS of the source BWP and the target BWP is determined as the first switching delay used by the first switching mode. That is, in the first switching mode, in response to the SCS of the source BWP being identical to the SCS of the target BWP, the candidate value corresponding to the SCS of the source BWP and the target BWP is determined as the first switching delay used by the first switching mode.

For example, when the SCSs of the source BWP and the target BWP are identical and both are 15 KHz ($\mu$=0), as can be seen in Table 1, the candidate value corresponding to the SCS of the source BWP and the target BWP, i.e., the corresponding candidate value when $\mu$=0, is 1 ms, and thus the first switching delay used by the first switching mode can be 1 ms. For another example, when the SCSs of the source BWP and the target BWP are identical and both are 60 KHz ($\mu$=2), as can be seen in Table 1, the candidate value corresponding to the SCS of the source BWP and the target BWP, i.e., the corresponding candidate value when $\mu$=2, is 0.25 ms, and thus the first switching delay used by the first switching mode can be 0.25 ms.

It is understood that each element or correspondence in Table 1 exists independently. The fact that these elements and correspondences are exemplarily listed in the same table does not mean that all the elements and correspondences in the table must exist at the same time as shown in Table 1. Each element value or correspondence is independent of any other element value or correspondence in Table 1. Therefore, it is understood by those skilled in the art that each element value or correspondence in the table 1 is an independent embodiment.

In a possible implementation of embodiments of the disclosure, the switching delay used by the second switching mode, i.e., the second switching delay, may have a plurality of candidate values, the plurality of candidate values correspond to different SCSs. For example, the switching delay used by the second switching method, i.e., the second switching delay, may be as shown in Table 2, and the candidate values corresponding to the second switching delay used by the second switching mode may be ($1/14$)×1 ms, ($0.5/14$)×1 ms, ($0.25/14$)×2 ms, or ($0.125/14$)×4 ms.

TABLE 2

| $\mu$ | NR symbol length (ms) | Interruption length (number of symbols) |
|---|---|---|
| 0 | 1/14 | 1 |
| 1 | 0.5/14 | 1 |
| 2 | 0.25/14 | 2 |
| 3 | 0.125/14 | 4 |

The magnitude of the candidate value corresponding to the second switching delay is measured in symbols.

It can be understood that each element or correspondence in Table 2 exists independently. The fact that these elements and correspondences are exemplarily listed in the same table does not mean that all of the elements and correspondences in the table must exist at the same time as shown in Table 2. Each element value or correspondence is independent of any other element value or correspondence in Table 2. Therefore, it can be understood by those skilled in the art that each element value or correspondence in Table 2 is an independent embodiment.

As a possible implementation, when a SCS of the source BWP is different from a SCS of the target BWP, a larger value from a candidate value corresponding to the SCS of the source BWP and a candidate value corresponding to the SCS of the target BWP is determined as the second switching delay used by the second switching mode. That is, in the second switching mode, in response to the SCS of the source BWP being different from the SCS of the target BWP, a larger value from the candidate value corresponding to the SCS of the source BWP and the candidate value corresponding to the SCS of the target BWP is determined as the second switching delay used by the second switching mode.

For example, when the SCS of the source BWP is 60 KHz ($\mu$=2) and the SCS of the target BWP is 15 KHz ($\mu$=0), as can be seen in Table 2, the candidate value corresponding to the SCS of the source BWP, i.e., the corresponding candidate value when $\mu$=2, is $\frac{0.25}{14}$ ms (corresponding to 2 interruption symbols), while the candidate value corresponding to the SCS of the target BWP, i.e., the corresponding candidate value when $\mu$=0, is $\frac{1}{14}$ ms (corresponding to 1 interruption symbol). Then, the second switching delay used by the second switching mode can be $\frac{1}{14}$ ms.

As a possible implementation, when the SCS of the source BWP is identical to the SCS of the target BWP, a candidate value corresponding to the SCS of the source BWP and the SCS of the target BWP is determined as the second switching delay used by the second switching mode. That is, in the second switching mode, in response to the SCS of the source BWP being identical to the SCS of the target BWP, the candidate value corresponding to the SCS of the source BWP and the SCS of the target BWP is determined as the second switching delay used by the second switching mode.

For example, when the SCSs of the source BWP and the target BWP are identical and both are 15 KHz ($\mu$=0), as can be seen in Table 2, the candidate value corresponding to the SCS of the source BWP and the target BWP, i.e., the corresponding candidate value when 11=0, is $\frac{1}{14}$ ms, and thus the second switching delay used by the second switching mode can be $\frac{1}{14}$ ms. For another example, when the SCSs of the source BWP and the target BWP are identical and both are 60 KHz ($\mu$=2), as can be seen in Table 2, the candidate value corresponding to the SCS of the source BWP and the target BWP, i.e., the corresponding candidate value when $\mu$=2, is $\frac{0.25}{14}$ ms, and thus the second switching delay used by the second switching mode can be $\frac{0.25}{14}$ ms.

In the embodiment of the disclosure, the network device may configure a plurality of BWPs for the terminal device, and the terminal device employs only one BWP to communicate with the network device at one moment. The terminal device may switch from the source BWP to the target BWP by using the first switching mode or the second switching mode for BWP switching.

In a possible implementation of embodiments of the disclosure, the network device may instruct the terminal device to perform the BWP switching, to switch from the source BWP to the target BWP. For example, the network device may send first trigger information to the terminal device. The first trigger information is used for instructing the terminal device to switch from the source BWP to the target BWP. Correspondingly, when the terminal device receives the first trigger information, it may switch from the source BWP to the target BWP in response to the first trigger information.

For example, the network device is a base station. The base station may include multiple cells that provide services to the terminal device. Depending on the specific application occasions, each cell may include a plurality of transmitting receiving points (TRPs), or may be a device in an access network that communicates with a wireless terminal device over one or more sectors on a radio interface, or may have other names. For example, the base station involved in the embodiments of the disclosure may be a base transceiver station (BTS) in a global system for mobile communications (GSM) or code division multiple access (CDMA), or may be a NodeB in wide-band code division multiple access (WCDMA), an evolutional Node B (eNB or e-NodeB) in a long term evolution (LTE) system, a 5G base station (gNB) in a next generation system, a home evolved Node B (HeNB), a relay node, a femto, or a pico, which is not limited in the embodiments of the disclosure.

In a possible implementation of embodiments of the disclosure, the terminal device can also trigger the BWP switching by itself. For example, in the case of a random access triggered by a scheduling request (SR), if a current BWP (i.e., the source BWP) does not have physical random access channel (PRACH) resources, the terminal device can trigger the switching to the target BWP (e.g., the target BWP can be an initial BWP or one of the candidate BWPs). For another example, in the case of a random access triggered by beam failure recovery (BFR), if the current BWP (i.e., the source BWP) does not have PRACH resources, the terminal device can trigger the switching to the target BWP (e.g., the target BWP can be the initial BWP or one of the candidate BWPs).

In the embodiment of the disclosure, when the terminal device performs the BWP switching, it may use the first switching mode or the second switching mode to switch from the source BWP to the target BWP, thereby realizing the BWP switching using the first switching mode or the second switching mode, which is more flexible. In addition, the switching delay of the second switching mode is shorter, and thus the demand of the service with a relatively high requirement for delay can be satisfied and the applicability of the method can be improved.

According to the method for BWP switching of the embodiments of the disclosure, the terminal device switches from the source BWP to the target BWP by using the first switching mode or the second switching mode. The switching delay used by the first switching mode is longer than the switching delay used by the second switching mode. Therefore, the terminal device can realize the BWP switching by using the first switching mode or the second switching mode, which is more flexible. Moreover, the switching delay of the second switching mode is shorter, which can satisfy the demand of the service with a relatively high requirement for time delay and improve the applicability of this method.

It should be noted that these possible implementations described above may be performed independently or in combination, which is not limited in the embodiments of the disclosure.

Figure 2:
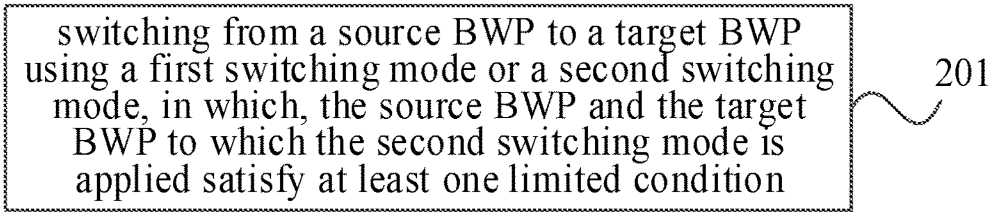
FIG. 2 is a flowchart of a method for BWP switching according to an embodiment of the disclosure.

The embodiments of the disclosure provide another method for BWP switching. FIG. 2 is a flowchart of a method for BWP switching provided by an embodiment of the disclosure. The method can be performed by a terminal device. The method may be performed independently or in combination with any of the embodiments or possible implementations of the embodiments of the disclosure, or in combination with any of the technical solutions in the related art.

As illustrated in FIG. 2, the method may include the following steps.

At step 201, switching from a source BWP to a target BWP is performed using a first switching mode or a second switching mode, in which the source BWP and the target BWP to which the second switching mode is applied satisfy at least one limited condition.

That is, the embodiments of the disclosure involve a set of candidate switching modes. The set of candidate switching modes at least includes the first switching mode and the second switching mode. A switching mode is determined from the set of candidate switching modes to switch from the source BWP to the target BWP according to the switching mode.

That is, in the embodiments of the disclosure, a mode in which the terminal device performs the BWP switching is configurable. In some embodiments, the mode for the BWP switching may be determined based on communication specifications, network side configuration, or preset switching configuration parameters.

The switching delay used by the first switching mode is longer than the switching delay used by the second switching mode.

It should be noted that the explanations of the first switching mode and the second switching mode in the preceding embodiments are also applicable to this embodiment and will not be repeated here.

In a possible implementation of embodiments of the disclosure, the limited condition may include: configuration parameters of at least one of SCSs, center frequency points and bandwidths of the source BWP and the target BWP being identical.

In a possible implementation of the disclosure, the limited condition may include: the source BWP and the target BWP carrying different channels and/or signals.

For example, the channels carried by the source BWP may be different from the channels carried by the target BWP. For example, the source BWP may carry fewer channels than the target BWP. For example, the source BWP carries a physical downlink control channel (PDCCH), and the target BWP carries a PDCCH and a physical downlink shared channel (PDSCH). Alternatively, the source BWP may carry more channels than the target BWP. For example, the source BWP carries a PDCCH and a PDSCH, and the target BWP carries a PDSCH. Alternatively, the number of channels carried by the source BWP can be equal to the number of channels carried by the target BWP, but the channels carried by the source BWP and the channels carried by the target BWP are not exactly identical. For example, a channel carried by the source BWP is a PDCCH and a channel carried by the target BWP is a PDSCH.

As another example, the signals carried by the source BWP may be different from the signals carried by the target BWP. For example, the source BWP may carry fewer signals than the target BWP. For example, the source BWP supports synchronization signal/PBCH (physical broadcast channel) block (SSB) transmission, and the target BWP supports SSB and channel state information-reference signals (CSI-RS) transmissions. Alternatively, the source BWP may carry more signals than the target BWP. For example, the source BWP supports SSB and CSI-RS transmissions, and the target BWP supports SSB transmission. Alternatively, the number of signals carried by the source BWP may be equal to the number of signals carried by the target BWP, but the signals carried by the source BWP and the target BWP are not exactly identical. For example, the source BWP supports the SSB transmission and the target BWP supports the CSI-RS transmission.

As another example, the channels and signals carried by the source BWP may be different from the channels and signals carried by the target BWP. For example, one of the source BWP and the target BWP carrying fewer channels and signals than the other. For example, one of the source BWP and the target BWP supports transmission of PDCCH, PDSCH, SSB, CSI-RS, and the other one only supports transmission of PDSCH. Alternatively, the number of channels and signals carried by one of the source BWP and the target BWP can be equal to the number of channels and/or signals carried by the other BWP, but the channels and signals that are carried by the source BWP and the target BWP are not exactly the same. For example, one of the source BWP and the target BWP supports transmissions of PDCCH and SSB, while the other BWP supports transmissions of PDSCH and CSI-RS.

In a possible implementation of the disclosure, the limited condition may include: channels and/or signals carried by at least one of a source BWP and a target BWP to which the second switching mode is applied being different from channels and/or signals carried by a BWP to which the first switching mode is applied.

In the embodiment of the disclosure, the channels and/or signals carried by at least one of the source BWP and the target BWP to which the second switching mode is applied may be different from the channels and/or signals carried by the BWP to which the first switching mode is applied. For example, the channels and/or signals carried by at least one of the source BWP and the target BWP to which the second switching mode is applied may be fewer than the channels and/or signals carried by the BWP to which the first switching mode is applied.

For example, the BWP to which the first switching mode is applied may support transmissions of PDCCH, PDSCH, SSB and CSI-RS, and one of the source BWP and the target BWP to which the second switching mode is applied may only support transmission of PDSCH.

It is understood that when the channels and/or signals carried by the BWP to which the second switching mode is applied is fewer than the channels and/or signals carried by the BWP to which the first switching mode is applied, the configuration duration of the second switching mode is shorter with respect to that of the first switching mode when performing the BWP switching, and the switching delay can be reduced.

It is noted that the foregoing is only an example in which there is only one limited condition, and in practice, the limited condition may also be a combination of any two the above three conditions, or, the limited condition may also include all of the above three conditions at the same time, which is not limited in the disclosure.

According to the method for BWP switching of the embodiments of the disclosure, the terminal device switches from the source BWP to the target BWP by using the first switching mode or the second switching mode. The switching delay used by the first switching mode is longer than the switching delay used by the second switching mode. Therefore, the terminal device can realize the BWP switching by using the first switching mode or the second switching mode, which is more flexible. Moreover, the switching delay of the second switching mode is shorter, which can satisfy the demand of the service with a relatively high requirement for time delay and improve the applicability of this method.

It should be noted that these possible implementations described above may be performed independently or in combination, which is not limited in the embodiments of the disclosure.

Figure 3:
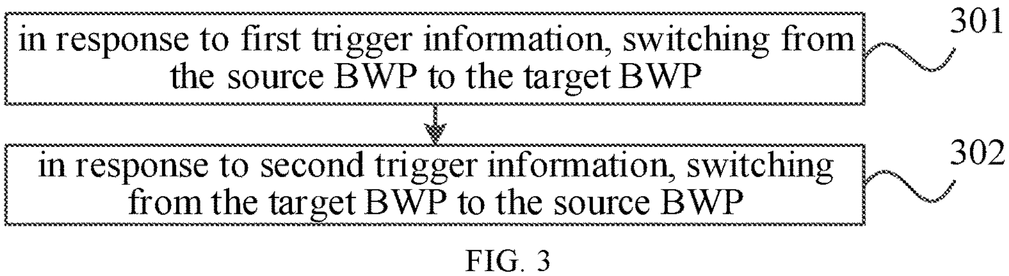
FIG. 3 is a flowchart of a method for BWP switching according to an embodiment of the disclosure.

The embodiments of the disclosure provide another method for BWP switching. FIG. 3 is a flowchart of a method for BWP switching provided by an embodiment of the disclosure. The method may be performed by a terminal device. The method can be implemented independently, or in combination with any of the embodiments or possible implementations of the embodiments of the disclosure, or in combination with any of the technical solutions in the related art.

As illustrated in FIG. 3, the method for BWP switching may include the following steps.

At step 301, in response to first trigger information, the terminal device switches from the source BWP to the target BWP.

In the embodiment of the disclosure, the network device may send the first trigger information to the terminal device. The first trigger information is used to instruct the terminal device to switch from the source BWP to the target BWP. Correspondingly, when the terminal device receives the first trigger information, it may switch from the source BWP to the target BWP in response to the first trigger information. The terminal device may use the first trigger mode or the second trigger mode to switch from the source BWP to the target BWP.

It should be noted that the explanations of the first switching mode and the second switching mode in any of the preceding embodiments are also applicable to this embodiment and will not be repeated herein.

As an example, the first trigger information may include downlink control information (DCI). The network device may instruct the terminal device to switch from the source BWP to the target BWP by sending the DCI to the terminal device. Correspondingly, after receiving the DCI, the terminal device may switch from the source BWP to the target BWP in response to the DCI.

At step 302, in response to second trigger information, the terminal device switches from the target BWP to the source BWP.

In the second switching mode, the first trigger information is identical to or different from the second trigger information.

In a possible implementation of embodiments of the disclosure, in the second switching mode, the first trigger information may be identical to the second trigger information. That is, the network device may instruct the terminal device to perform the BWP switching to switch from the target BWP to the source BWP. For example, the first trigger information and the second trigger information both include the DCI, and the network device may send the DCI to the terminal device to instruct the terminal device to switch from the target BWP to the source BWP.

In a possible implementation of embodiments of the disclosure, in the second switching mode, the first trigger information may be different from the second trigger information. For example, the target BWP may carry a data transmission channel, and the terminal device may switch to the target BWP to transmit data, and when the transmission of the data transmission channel carried by the target BWP is completed, the second switching mode may be used to switch from the target BWP to the source BWP. That is, the second trigger information may include a target trigger event, the target trigger event is completion of transmission of the data transmission channel carried by the target BWP.

For example, in a case that the target BWP is more suitable to carry the data transmission channel, the terminal device can use the second switching mode to switch from the source BWP to the target BWP to transmit data. When the data transmission is completed, switching back to the source BWP is triggered, i.e., the second switching mode is adopted to switch from the target BWP to the source BWP.

Therefore, the terminal device can be triggered to switch back to the source BWP in a variety of ways, which can improve the flexibility of the triggering mode or switching mode, and enhance the applicability of the method.

It should be noted that steps 301 and 302 may be executed separately or together. That is, the terminal device may switch from the source BWP to the target BWP according to step 301, but the terminal device does not perform the step 302 of switching from the target BWP to the source BWP, or the terminal device switches from the target BWP to the source BWP based on some other related techniques different from step 302. Alternatively, the terminal device may switch from the target BWP to the source BWP according to step 302, but the terminal device does not perform the step 301 of switching from the source BWP to the target BWP, or the terminal device switches from the source BWP to the target BWP based on other related techniques different from step 301.

According to the method for BWP switching of the embodiments of the disclosure, the terminal device switches from the source BWP to the target BWP by using the first switching mode or the second switching mode. The switching delay used by the first switching mode is longer than the switching delay used by the second switching mode. Therefore, the terminal device can realize the BWP switching by using the first switching mode or the second switching mode, which is more flexible. Moreover, the switching delay of the second switching mode is shorter, which can satisfy the demand of the service with a relatively high requirement for time delay and improve the applicability of this method.

It should be noted that these possible implementations described above may be performed independently or together, which is not limited in the embodiments of the disclosure.

Figure 4:
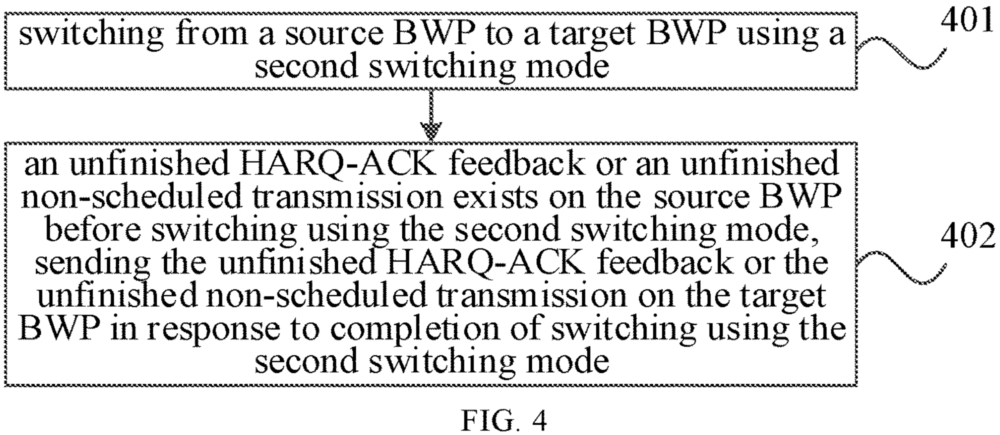
FIG. 4 is a flowchart of a method for BWP switching according to an embodiment of the disclosure.

The embodiments of the disclosure provide another method for BWP switching. FIG. 4 is a flowchart of a method for BWP switching provided by an embodiment of the disclosure. The method is performed by a terminal device. The method can be implemented independently, or in combination with any of the embodiments or possible implementations of the embodiments of the disclosure, or in combination with any of the technical solutions in the related art.

As illustrated in FIG. 4, the method includes the following steps.

At step 401, switching from the source BWP to the target BWP is performed using the second switching mode.

In the embodiment of the disclosure, step 401 may be realized in any one of the embodiments of the disclosure, respectively, which is not limited in the embodiment of the disclosure and will not be repeated.

At step 402, an unfinished hybrid automatic repeat request-acknowledgement (HARQ-ACK) feedback or an unfinished non-scheduled transmission exists on the source BWP before switching using the second switching mode, then, the unfinished HARQ-ACK feedback or the unfinished non-scheduled transmission is sent on the target BWP in response to completion of switching using the second switching mode.

In the embodiment of the disclosure, before the terminal device switches from the source BWP to the target BWP by using the second switching mode, if there is the unfinished HARQ-ACK feedback on the source BWP or there is the unfinished non-scheduled transmission on the source BWP, the terminal device can send the unfinished HARQ-ACK feedback or the unfinished non-scheduled transmission on the target BWP when the switching is completed by using the second switching mode, so that the reliability of data transmission can be ensured.

As a possible implementation of embodiments of the disclosure, in a situation where a transmission occasion is included within the switching delay when the terminal uses the second switching mode, the terminal device suspends sending or receiving the HARQ-ACK feedback or the non-scheduled transmission at the transmission occasion. The transmission occasion refers to a transmission slot or a symbol occupied by the HARQ-ACK feedback or the non-scheduled transmission included within the switching delay when switching using the second switching mode.

That is, the terminal device does not perform reception and sending of data during switching using the second switching mode, even if there is a transmission slot or a symbol occupied by the HARQ-ACK feedback or the non-scheduled transmission, i.e., it can suspend the reception and sending of data.

Optionally, the terminal may continue to send or receive the HARQ-ACK feedback or the non-scheduled transmission on the target BWP after the terminal device completes switching using the second switching mode.

In some possible implementations, there is a set of candidate switching modes, and the set of candidate switching modes includes at least the first switching mode and the second switching mode. A switching mode is determined from the set of candidate switching modes for switching from the source BWP to the target BWP according to the switching mode.

According to the method for BWP switching of the embodiments of the disclosure, the terminal device switches from the source BWP to the target BWP by using the first switching mode or the second switching mode. The switching delay used by the first switching mode is longer than the switching delay used by the second switching mode. Therefore, the terminal device can realize the BWP switching by using the first switching mode or the second switching mode, which is more flexible. Moreover, the switching delay of the second switching mode is shorter, which can satisfy the demand of the service with a relatively high requirement for time delay and improve the applicability of this method.

It should be noted that these possible implementations described above may be performed independently or together, which is not limited in the embodiments of the disclosure.

Figure 5:
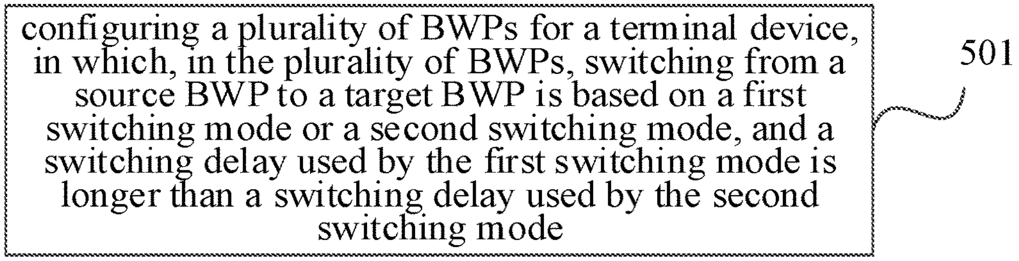
FIG. 5 is a flowchart of a method for BWP switching performed by a network device according to an embodiment of the disclosure.

The embodiments of the disclosure provide another method for BWP switching. FIG. 5 is a flowchart of a method for BWP switching provided by an embodiment of the disclosure. The method is performed by a network device. The method can be implemented independently, or in combination with any of the embodiments or possible implementations of the embodiments of the disclosure, or in combination with any of the technical solutions in the related art.

As illustrated in FIG. 5, the method includes the following steps.

At step 501, a plurality of BWPs are configured for a terminal device, in which, in the plurality of BWPs, switching from a source BWP to a target BWP is based on a first switching mode or a second switching mode, and a switching delay used by the first switching mode is longer than a switching delay used by the second switching mode.

In some possible implementations, there is a set of candidate switching modes, and the set of candidate switching modes includes at least the first switching mode and the second switching mode. A switching mode is determined from the set of candidate switching modes, so as to switch from the source BWP to the target BWP according to the switching mode.

In the embodiment of the disclosure, the source BWP is a BWP used for data transmission with the network device before the switching.

In the embodiment of the disclosure, the target BWP is a BWP adopted for data transmission with the network device after the switching.

In the embodiments of the disclosure, the switching delay used by the first switching mode is longer than the switching delay used by the second switching mode. For example, the switching delay used by the first switching mode is referred to as a first switching delay, and the switching delay used by the second switching mode is referred to as a second switching delay, the first switching delay is longer than the second switching delay, or the second switching delay is shorter than the first switching delay.

In a possible implementation of the disclosure, the switching delay used by the first switching mode, i.e., the first switching delay, may have a plurality of candidate values, and the plurality of candidate values correspond to different SCSs. As an example, the switching delay used by the first switching mode, i.e., the first switching delay may be as shown in Table 1, and the candidate values corresponding to the first switching delay used by the first switching mode may be 1 ms, 0.5 ms, 0.25 ms, and 0.125 ms.

As a possible implementation, when a SCS of the source BWP is different from a SCS of the target BWP, a larger value from a candidate value corresponding to the SCS of the source BWP and a candidate value corresponding to the SCS of the target BWP may be determined as the first switching delay used by the first switching mode. That is, in the first switching mode, in response to the SCS of the source BWP being different from the SCS of the target BWP, the larger value from the candidate value corresponding to the SCS of the source BWP and the candidate value corresponding to the SCS of the target BWP is determined as the first switching delay used by the first switching mode.

For example, when the SCS of the source BWP is 60 KHz ($\mu$=2) and the SCS of the target BWP is 15 KHz ($\mu$=0), as can be seen in Table 1, the candidate value corresponding to the SCS of the source BWP, i.e., the corresponding candidate value when $\mu$=2, is 0.25 ms, and the candidate value corresponding to the SCS of the target BWP, i.e., the corresponding candidate value when $\mu$=0, is 1 ms. Then, the first switching delay. Then the first switching mode can be 1 ms.

As a possible implementation of the disclosure, when the SCS of the source BWP is identical to the SCS of the target BWP, a candidate value corresponding to the SCS of the source BWP and the target BWP is determined as the first switching delay used by the first switching mode. That is, in the first switching mode, in response to the SCS of the source BWP being identical to the SCS of the target BWP, the candidate value corresponding to the SCS of the source BWP and the target BWP is determined as the first switching delay used by the first switching mode.

For example, when the SCSs of the source BWP and the target BWP are identical and both are 15 KHz ($\mu$=0), as can be seen in Table 1, the candidate value corresponding to the SCS of the source BWP and the target BWP, i.e., the corresponding candidate value when $\mu$=0, is 1 ms, and thus the first switching delay used by the first switching mode can be 1 ms. For another example, when the SCSs of the source BWP and the target BWP are identical and both are 60 KHz ($\mu$=2), as can be seen in Table 1, the candidate value corresponding to the SCS of the source BWP and the target BWP, i.e., the corresponding candidate value when $\mu$=2, is 0.25 ms, and thus the first switching delay used by the first switching mode can be 0.25 ms.

In a possible implementation of embodiments of the disclosure, the switching delay used by the second switching mode, i.e., the second switching delay, may have a plurality of candidate values, the plurality of candidate values correspond to different SCSs. As an example, the switching delay used by the second switching method, i.e., the second switching delay, may be as shown in Table 2, and the candidate values corresponding to the second switching delay used by the second switching mode may be $1/14$ ms, $0.5/14$ ms, $0.25/14$ ms, or $0.125/14$ ms.

As a possible implementation of the disclosure, when a SCS of the source BWP is different from a SCS of the target BWP, a larger value from a candidate value corresponding to the SCS of the source BWP and a candidate value corresponding to the SCS of the target BWP is determined as the second switching delay used by the second switching mode. That is, in the second switching mode, in response to the SCS of the source BWP being different from the SCS of the target BWP, a larger value from the candidate value corresponding to the SCS of the source BWP and the candidate value corresponding to the SCS of the target BWP is determined as the second switching delay used by the second switching mode.

For example, when the SCS of the source BWP is 60 KHz ($\mu=2$) and the SCS of the target BWP is 15 KHz ($\mu=0$), as can be seen in Table 2, the candidate value corresponding to the SCS of the source BWP, i.e., the corresponding candidate value when $\mu=2$, is $0.25/14$ ms (corresponding to 2 interruption symbols), while the candidate value corresponding to the SCS of the target BWP, i.e., the corresponding candidate value when $\mu=0$, is $1/14$ ms (corresponding to 1 interruption symbol). Then, the second switching delay used by the second switching mode can be $1/14$ ms.

As a possible implementation, when the SCS of the source BWP is identical to the SCS of the target BWP, a candidate value corresponding to the SCS of the source BWP and the SCS of the target BWP is determined as the second switching delay used by the second switching mode. That is, in the second switching mode, in response to the SCS of the source BWP being identical to the SCS of the target BWP, the candidate value corresponding to the SCS of the source BWP and the SCS of the target BWP is determined as the second switching delay used by the second switching mode.

For example, when the SCSs of the source BWP and the target BWP are identical and both are 15 KHz ($\mu=0$), as can be seen in Table 2, the candidate value corresponding to the SCS of the source BWP and the target BWP, i.e., the corresponding candidate value when $\mu=0$, is $1/14$ ms, and thus the second switching delay used by the second switching mode can be $1/14$ ms. For another example, when the SCSs of the source BWP and the target BWP are identical and both are 60 KHz ($\mu=2$), as can be seen in Table 2, the candidate value corresponding to the SCS of the source BWP and the target BWP, i.e., the corresponding candidate value when $\mu=2$, is $0.25/14$ ms, and thus the second switching delay used by the second switching mode can be $/0.25/14$ ms.

In the embodiment of the disclosure, the network device may configure a plurality of BWPs for the terminal device, and the terminal device employs only one BWP to communicate with the network device at one moment. The terminal device may switch from the source BWP to the target BWP by using the first switching mode or the second switching mode for BWP switching.

In a possible implementation of embodiments of the disclosure, the network device may instruct the terminal device to perform the BWP switching, to switch from the source BWP to the target BWP. For example, the network device may send first trigger information to the terminal device. The first trigger information is used for instructing the terminal device to switch from the source BWP to the target BWP. Correspondingly, when the terminal device receives the first trigger information, it may switch from the source BWP to the target BWP in response to the first trigger information.

In a possible implementation of embodiments of the disclosure, the terminal device can also trigger the BWP switching by itself. For example, in the case of a random access triggered by a SR, if a current BWP (i.e., the source BWP) does not have PRACH resources, the terminal device can trigger the switching to the target BWP (e.g., the target BWP can be an initial BWP or one of the candidate BWPs). For another example, in the case of a random access triggered by BFR, if the current BWP (i.e., the source BWP) does not have PRACH resources, the terminal device can trigger the switching to the target BWP (e.g., the target BWP can be the initial BWP or one of the candidate BWPs).

In the embodiment of the disclosure, when the terminal device performs the BWP switching, it can use the first switching mode or the second switching mode to switch from the source BWP to the target BWP, thereby realizing the BWP switching using the first switching mode or the second switching mode, which is more flexible. Moreover, the second switching mode has a shorter switching delay, which can satisfy the demand of the service with a relatively high requirement for delay, and improve the applicability of the method.

In a possible implementation of embodiments of the disclosure, the source BWP and the target BWP to which the second switching mode is applied satisfy at least one limited condition. The at least one limited condition includes at least one of the following conditions: configuration parameters of at least one of subcarrier spacings, center frequency points or bandwidths of the source BWP and the target BWP being identical; the source BWP and the target BWP carrying different channels and/or signals; and channels and/or signals carried by at least one of the source BWP and the target BWP being different from channels and/or signals carried by a BWP to which the first switching mode is applied.

In a possible implementation of embodiments of the disclosure, the source BWP and the target BWP carrying different channels and/or signals includes: one of the source BWP and the target BWP carrying fewer channels and/or signals than the other one of the source BWP and the target BWP.

In a possible implementation of embodiments of the disclosure, the channels and/or signals carried by the at least one of the source BWP and the target BWP being different from the channels and/or signals carried by the BWP to which the first switching mode is applied includes: the at least one of the source BWP and the target BWP carries fewer channels and/or signals than the BWP to which the first switching mode is applied.

In a possible implementation of embodiments of the disclosure, the network device may also send first trigger information to the terminal device, and the first trigger information is used to trigger the terminal device to switch from the source BWP to the target BWP. In the second switching mode, the first trigger information is identical to or different from second trigger information, and the second trigger information is used to trigger a switching from the target BWP to the source BWP.

In a possible implementation of embodiments of the disclosure, the target BWP carries a data transmission channel, the first trigger information includes DCI, and the second trigger information includes a target trigger event, in which the target trigger event is completion of transmission of the data transmission channel carried by the target BWP.

In a possible implementation of embodiments of the disclosure, an unfinished HARQ-ACK feedback or an unfinished non-scheduled transmission exists on the source BWP before switching using the second switching mode. Then, the unfinished HARQ-ACK feedback or the unfinished non-scheduled transmission is received on the target BWP in response to completion of the terminal device switching using the second switching mode.

In a possible implementation of embodiments of the disclosure, in response to the switching delay when using the second switching mode for the switching including a transmission occasion, sending or receiving the HARQ-ACK feedback or the non-scheduled transmission is suspended at the transmission occasion.

It is noted that the explanatory description of the method for BWP switching performed by the terminal device in any of the aforementioned embodiments of FIGS. 1 to 4 is also applicable to the method for BWP switching performed by the network device in this embodiment, the principle of implementation is similar and will not be repeated here.

According to the method for BWP switching of the embodiments of the disclosure, the network device configures the plurality of BWPs for the terminal device. In the plurality of BWPs, switching from the source BWP to the target BWP is based on the first switching mode or the second switching mode, and the switching delay used by the first switching mode is longer than the switching delay used by the second switching mode. Therefore, the terminal device can realize the BWP switching using the first switching mode or the second switching mode, which is a more flexible. In addition, the switching delay of the second switching mode is shorter, so that it can satisfy the demand of the service with a relatively high requirement for time delay, and improve the applicability of the method.

It should be noted that these possible implementations described above may be performed independently or together, which is not limited in the embodiments of the disclosure.

Corresponding to the method for BWP switching provided in the above-described embodiments of FIGS. 1 to 4, the disclosure also provides an apparatus for BWP switching. Since the apparatus for BWP switching provided in the embodiment of the disclosure corresponds to the method for BWP switching provided in the above-described embodiments of FIGS. 1 to 4, the implementations of the method for BWP switching are applicable to the apparatus for BWP switching provided in the embodiment of the disclosure, which are not described in detail in the embodiments of the disclosure.

Figure 6:
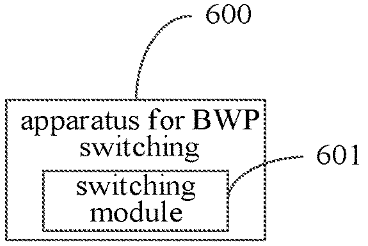
FIG. 6 is a block diagram of an apparatus for BWP switching applicable to a terminal device according to an embodiment of the disclosure.

FIG. 6 is a schematic diagram of an apparatus 600 for BWP switching provided by an embodiment of the disclosure. The apparatus is performed in a terminal device.

As illustrated in FIG. 6, the apparatus 600 includes: a switching module 601.

The switching module 601 is configured to switch from a source BWP to a target BWP using a first switching mode or a second switching mode, in which, a switching delay used by the first switching mode is longer than a switching delay used by the second switching mode.

Optionally, the switching delay used by the second switching mode has a plurality of candidate values, and the plurality of candidate values correspond to different SCS s.

Optionally, the apparatus 600 may further include: a first processing module, configured to, in the second switching mode, in response to a SCS of the source BWP being different from a SCS of the target BWP, determine a larger value from a candidate value corresponding to the SCS of the source BWP and a candidate value corresponding to the SCS of the target BWP as the switching delay used by the second switching mode.

Optionally, the apparatus 600 may further include: a second processing module, configured to, in the second switching mode, in response to a SCS of the source BWP being identical to a SCS of the target BWP in the second switching mode, determine a candidate value corresponding to the SCS of the source BWP and the SCS of the target BWP as the switching delay used by the second switching mode.

Optionally, the source BWP and the target BWP to which the second switching mode is applied satisfy at least one limited condition. The at least one limited condition includes at least one of the following conditions: configuration parameters of at least one of subcarrier spacings, center frequency points, or bandwidths of the source BWP and the target BWP being identical; the source BWP and the target BWP carrying different channels and/or signals; and channels and/or signals carried by at least one of the source BWP and the target BWP being different from channels and/or signals carried by a BWP to which the first switching mode is applied.

Optionally, the source BWP and the target BWP carrying different channels and/or signals includes: one of the source BWP and the target BWP carrying fewer channels and/or signals than the other one of the source BWP and the target BWP.

Optionally, the channels and/or signals carried by at least one of the source BWP and the target BWP being different from the channels and/or signals carried by the BWP to which the first switching mode is applied includes: the at least one of the source BWP and the target BWP carries fewer channels and/or signals than the BWP to which the first switching mode is applied.

Optionally, the switching module 601 is configured to: in response to first trigger information switch from the source BWP to the target BWP.

The switching module 601 is further configured to: in response to second trigger information, switch from the target BWP to the source BWP. In the second switching mode, the first trigger information is identical to or different from the second trigger information.

Optionally, the target BWP carries a data transmission channel, the first trigger information includes DCI, and the second trigger information includes a target trigger event, in which the target trigger event is completion of transmission of the data transmission channel carried by the target BWP.

Optionally, an unfinished HARQ-ACK feedback or an unfinished non-scheduled transmission exists on the source BWP before switching using the second switching mode.

The apparatus 600 may further include: a third processing module, configured to, in response to completion of switching using the second switching mode, send the unfinished HARQ-ACK feedback or the unfinished non-scheduled transmission on the target BWP.

Optionally, the apparatus 600 may further include: a suspending module, configured to, in response to the switching delay when using the second switching mode for switching including a transmission occasion, suspend sending or receiving the HARQ-ACK feedback or the non-scheduled transmission at the transmission occasion.

With the apparatus for BWP switching of the embodiment of the disclosure, the terminal device switches from the source BWP to the target BWP using the first switching mode or the second switching mode, and the switching delay used by the first switching mode is longer than the switching delay used by the second switching mode. Therefore, the terminal device can uses the first switching mode or the second switching mode for BWP switching, which is more flexible, and the switching delay of the second switching mode is shorter, which can satisfy the demand of the service with a relatively high requirement for delay, and improve the applicability of the method.

Corresponding to the method for BWP switching provided in the above-described embodiment of FIG. 5, the disclosure also provides an apparatus for BWP switching. Since the apparatus for BWP switching provided in the embodiment of the disclosure corresponds to the method for BWP switching provided in the above-described embodiment of FIG. 5, the implementations of the method for BWP switching are applicable to the apparatus for BWP switching provided in the embodiment of the disclosure, which are not described in detail in the embodiments of the disclosure.

Figure 7:
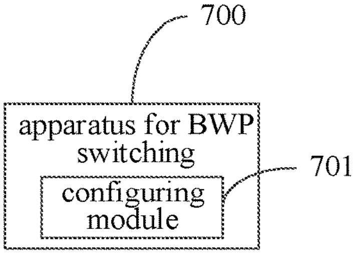
FIG. 7 is a block diagram of an apparatus for BWP switching applicable to a network device according to an embodiment of the disclosure.

FIG. 7 is a schematic diagram of an apparatus 700 for BWP switching provided by an embodiment of the disclosure. The apparatus is performed in a network device.

As illustrated in FIG. 7, the apparatus 700 includes: a configuring module 701.

The configuring module 701 is configured to configure a plurality of BWPs for a terminal device, in which, in the plurality of BWPs, switching from a source BWP to a target BWP is based on a first switching mode or a second switching mode, and a switching delay used by the first switching mode is longer than a switching delay used by the second switching mode.

Optionally, the switching delay used by the second switching mode has a plurality of candidate values, and the plurality of candidate values correspond to different SCSs.

Optionally, a SCS of the source BWP is different from a SCS of the target BWP, and a larger value from a candidate value corresponding to the SCS of the source BWP and a candidate value corresponding to the SCS of the target BWP is determined as the switching delay of the second switching mode.

Optionally, a SCS of the source BWP is identical to a SCS of the target BWP, and a candidate value corresponding to the SCS of the source BWP and the SCS of the target BWP is determined as the switching delay of the second switching mode.

Optionally, the source BWP and the target BWP to which the second switching mode is applied satisfy at least one limited condition. The at least one limited condition includes at least one of the following conditions: configuration parameters of at least one of: SCSs, center frequency points, or bandwidths of the source BWP and the target BWP being identical; the source BWP and the target BWP carrying different channels and/or signals; and channels and/or signals carried by at least one of the source BWP and the target BWP being different from channels and/or signals carried by a BWP to which the first switching mode is applied.

Optionally, the source BWP and the target BWP carrying different channels and/or signals includes: one of the source BWP and the target BWP carrying fewer channels and/or signals than the other one of the source BWP and the target BWP.

Optionally, the channels and/or signals carried by at least one of the source BWP and the target BWP being different from the channels and/or signals carried by the BWP to which the first switching mode is applied includes: the at least one of the source BWP and the target BWP carries fewer channels and/or signals than the BWP to which the first switching mode is applied.

Optionally, the apparatus 700 may further include: a sending module, configured to send first trigger information to the terminal device, and the first trigger information being configured to trigger the terminal device to switch from the source BWP to the target BWP. In the second switching mode, the first trigger information is identical to or different from second trigger information, and the second trigger information is configured to trigger a switching from the target BWP to the source BWP.

Optionally, the target BWP carries a data transmission channel, the first trigger information includes DCI, and the second trigger information includes a target trigger event, in which the target trigger event is completion of transmission of the data transmission channel carried by the target BWP.

Optionally, an unfinished HARQ-ACK feedback or an unfinished non-scheduled transmission exists on the source BWP before switching using the second switching mode.

The apparatus 700 may further include: a processing module, configured to, in response to completion of the terminal device switching using the second switching mode, receive the unfinished HARQ-ACK feedback or the unfinished non-scheduled transmission on the target BWP.

Optionally, the apparatus 700 may further include: a suspending module, configured to, in response to the switching delay when using the second switching mode for switching including a transmission occasion, suspend sending or receiving the HARQ-ACK feedback or the non-scheduled transmission at the transmission occasion.

With the apparatus for BWP switching of the embodiment of the disclosure, the network device configures the plurality of BWPs for the terminal device, in which, in the plurality of BWPs, switching from the source BWP to the target BWP is based on the first switching mode or the second switching mode, and the switching delay used by the first switching mode is longer than the switching delay used by the second switching mode. Therefore, the terminal device can use the first switching mode or the second switching mode for BWP switching, which is more flexible, and the switching delay of the second switching mode is shorter, which can satisfy the demand of the service with a relatively high requirement for time delay, and improve the applicability of the method.

In order to realize the above embodiments, the disclosure also provides a communication device.

The embodiments of the disclosure provide a communication device including a processor, a transceiver, a memory and executable programs stored on the memory and capable of being run by the processor. When the executable programs are executed by the processor, the above methods are implemented.

The communication device may be the network device or the terminal device as previously described.

The processor may include various types of storage mediums that are non-transitory computer storage mediums capable of continuing to memorize information stored thereon after the communication device is powered down. The communication device includes a network device or a terminal.

The processor may be connected to the memory via a bus, for reading the executable programs stored on the memory, e.g., as in at least one of FIGS. 1 to 5.

In order to realize the foregoing embodiments, the disclosure also provides a computer storage medium.

The embodiments of the disclosure provide a computer storage medium having executable programs stored thereon.

When the executable programs are executed by a processor, the above methods, e.g., as at least one of FIGS. 1 to 5, can be realized.

Figure 8:
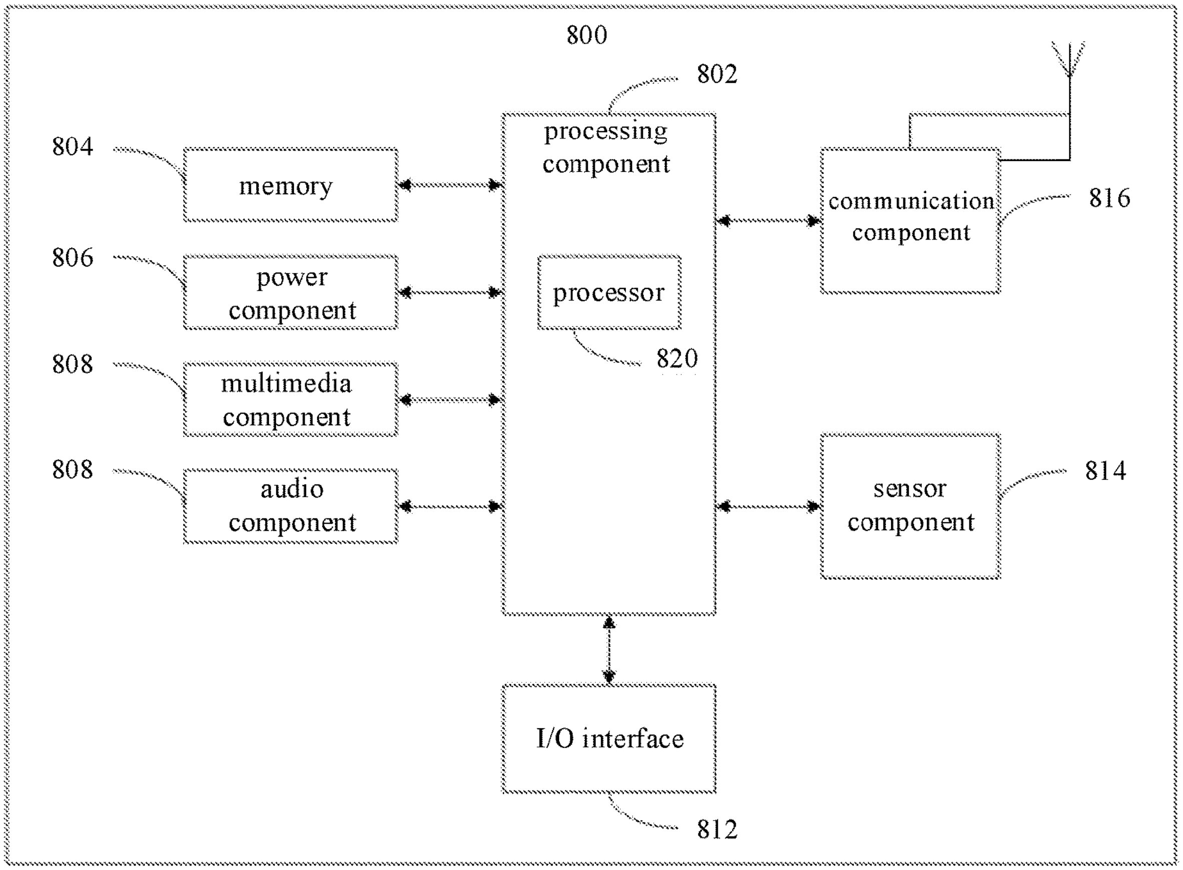
FIG. 8 is a block diagram of a terminal device according to an embodiment of the disclosure.

FIG. 8 is a block diagram of a terminal device 800 according to an embodiment of the disclosure. For example, the terminal device 800 may be a mobile phone, a computer, a digital broadcasting UE, a message transceiver device, a game console, a tablet device, a medical device, a fitness device and a PDA.

As illustrated in FIG. 8, the terminal device 800 may include at least one of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone call, data communication, camera operation, and recording operation. The processing component 802 may include at least one processor 820 to perform instructions to implement all or part of the steps in the above described methods. Moreover, the processing component 802 may include at least one module which facilitates the interaction between the processing component 802 and other components. For example, the processing component 802 may include a multimedia module to facilitate the interaction between the multimedia component 808 and the processing component 802.

The memory 804 is configured to store various types of data to support the operations of the terminal device 800. Examples of such data include instructions for any applications or methods operated on the terminal device 800, contact data, phonebook data, messages, pictures, videos, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or an optical disk.

The power component 806 provides power to various components of the terminal device 800. The power component 806 may include a power management system, at least one power source, and any other components associated with the generation, management, and distribution of power in the terminal device 800.

The multimedia component 808 includes a screen providing an output interface between the terminal device 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the terminal device 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the terminal device 800 is in an operation mode, such as a calling mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes at least one sensor to provide status assessments of various aspects of the terminal device 800. For instance, the sensor component 814 may detect an open/closed status of the terminal device 800, relative positioning of components, e.g., the display and the keypad, of the terminal device 800, a change in position of the terminal device 800 or a component of the terminal device 800, a presence or absence of a user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a Complementary Metal Oxide Semiconductor (CMOS) or Charge-Coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal device 800 and other devices. The terminal device 800 can access a wireless network based on a communication standard, such as WiFi, 2G, or 3G, or a combination thereof. In an exemplary embodiment, the communication component 816 receives a broadcast signal from an external broadcast management system or broadcast associated information via a broadcast channel. In an exemplary embodiment, the communication component 816 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the terminal device 800 may be implemented with at least one Application Specific Integrated Circuit (ASIC), Digital Signal Processor (DSP), Digital Signal Processing Device (DSPD), Programmable Logic Device (PLD), Field Programmable Gate Array (FPGA), controller, micro-controller, microprocessor or other electronic components, for performing the above described method according to any embodiment in FIGS. 1 to 4.

In the exemplary embodiments, there is also provided a non-transitory computer readable storage medium including instructions, such as the memory 804. The instructions are executable by the processor 820 in the terminal device 800, for implementing the above methods. For example, the non-transitory computer-readable storage medium may be a ROM, a Random Access Memory (RAM), a CD-ROM, a magnetic tape, a floppy disc, and an optical data storage device.

Figure 9:
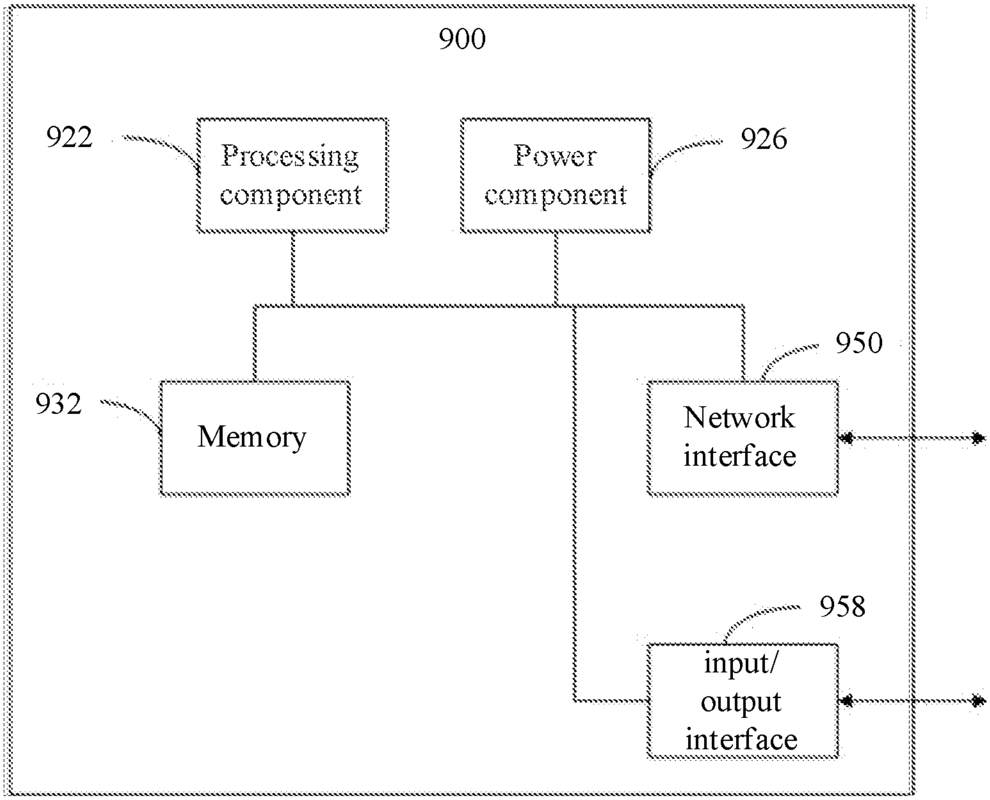
FIG. 9 is a schematic diagram of a network device according to an embodiment of the disclosure.

FIG. 9 is a schematic diagram of a network device 900 according to an embodiment of the disclosure. As illustrated in FIG. 9, the network device 900 includes a processing component 922 including at least one processor, and memory resources represented by a memory 932 for storing instructions that can be executed by the processing component 922, such as application programs. The application programs stored in the memory 932 may include one or more modules each corresponding to a set of instructions. In addition, the processing component 922 is configured to execute the instructions to perform the method described above that is performed by the network device, e.g., the method for BWP switching shown in FIG. 5.

The network device 900 may also include a power component 926 configured to perform power management of the network device 900, a wired or wireless network interface 950 configured to connect the network device 900 to a network, and an I/O interface 958. The network device 900 may operate on an operating system stored in the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for bandwidth part (BWP) switching, performed by a terminal device, comprising:

determining a target switching mode from a set of candidate switching modes, wherein the set of candidate switching modes comprises a first switching mode and a second switching mode;

switching from a source BWP to a target BWP using the target switching mode; wherein, a switching delay used by the first switching mode is longer than a switching delay used by the second switching mode;

wherein the source BWP and the target BWP to which the second switching mode is applied satisfy at least one limited condition;

wherein the at least one limited condition comprises: information carried by at least one of the source BWP or the target BWP to which the second switching mode is applied being different from information carried by a BWP to which the first switching mode is applied, wherein the information comprises at least one of a channel or a signal.

2. The method of claim 1, wherein the switching delay used by the second switching mode has a plurality of candidate values, and the plurality of candidate values correspond to different subcarrier spacings (SCSs).

3. The method of claim 2, further comprising:

determining to use the second switching mode, determining that a SCS of the source BWP is different from a SCS of the target BWP, and determining a larger value from a candidate value corresponding to the SCS of the source BWP and a candidate value corresponding to the SCS of the target BWP as the switching delay used by the second switching mode; or, determining to use the second switching mode, determining that the SCS of the source BWP is identical to the SCS of the target BWP, and determining a candidate value corresponding to the SCS of the source BWP or the SCS of the target BWP as the switching delay used by the second switching mode.

4. The method of claim 2, further comprising:

in the second switching mode, determining that a SCS of the source BWP is different from a SCS of the target BWP, and determining switching delay used by the second switching mode based on a first SCS, wherein the first SCS is a smaller one of the SCS of the source BWP and the SCS of the target BWP.

5. The method of claim 1, wherein the at least one limited condition further comprises:

the source BWP and the target BWP carrying different information, wherein the information comprises a channel or a signal.

6. The method of claim 5, wherein the source BWP and the target BWP carrying different information comprises:

one of the source BWP and the target BWP carrying fewer information than the other one of the source BWP and the target BWP; or, wherein the information carried by at least one of the source BWP and the target BWP being different from the information carried by the BWP to which the first switching mode is applied comprises:

the at least one of the source BWP and the target BWP carries fewer information than the BWP to which the first switching mode is applied.

7. The method of claim 1, wherein switching from the source BWP to the target BWP comprises:

switching from the source BWP to the target BWP based on first trigger information;

the method further comprising:

switching from the target BWP to the source BWP based on second trigger information; wherein determining to use the second switching mode, the first trigger information is identical to or different from the second trigger information;

wherein, the target BWP carries a data transmission channel;

the first trigger information comprises downlink control information (DCI); and the second trigger information comprises a target trigger event, wherein the target trigger event is completion of transmission of the data transmission channel carried by the target BWP.

8. The method of claim 1, wherein an unfinished hybrid automatic repeat request-acknowledgement (HARQ-ACK) feedback or an unfinished non- scheduled transmission exists on the source BWP before switching using the second switching mode, the method further comprises:

determining completion of switching using the second switching mode, sending the unfinished HARQ-ACK feedback or the unfinished non-scheduled transmission on the target BWP.

9. The method of claim 8, further comprising:

determining that the switching delay when using the second switching mode for switching comprises a transmission occasion, suspending sending or receiving the HARQ-ACK feedback or the non-scheduled transmission at the transmission occasion.

10. A method for BWP switching, performed by a network device, comprising:

configuring a plurality of BWPs for a terminal device, wherein, in the plurality of BWPs, switching from a source BWP to a target BWP is based on a target switching mode determined from a set of candidate switching modes, wherein the set of candidate switching modes comprises a first switching mode or a second switching mode, and a switching delay used by the first switching mode is longer than a switching delay used by the second switching mode;

wherein the source BWP and the target BWP to which the second switching mode is applied satisfy at least one limited condition;

wherein the at least one limited condition comprises: information carried by at least one of the source BWP or the target BWP to which the second switching mode is applied being different from information carried by a BWP to which the first switching mode is applied, wherein the information comprises at least one of a channel or a signal.

11. The method of claim 10, wherein the switching delay used by the second switching mode has a plurality of candidate values, and the plurality of candidate values correspond to different subcarrier spacings (SCSs).

12. The method of claim 11, wherein, a SCS of the source BWP is different from a SCS of the target BWP, and a larger value from a candidate value corresponding to the SCS of the source BWP and a candidate value corresponding to the SCS of the target BWP is determined as the switching delay of the second switching mode; or, the SCS of the source BWP is identical to the SCS of the target BWP, and a candidate value corresponding to the SCS of the source BWP or the SCS of the target BWP is determined as the switching delay of the second switching mode.

13. The method of claim 10, wherein the at least one limited condition further comprises:

the source BWP and the target BWP carrying different information, wherein the information comprises a channel or a signal.

14. The method of claim 13, wherein the source BWP and the target BWP carrying different information comprises:

one of the source BWP and the target BWP carrying fewer information than the other one of the source BWP and the target BWP; or, wherein the information carried by at least one of the source BWP and the target BWP being different from the information carried by the BWP to which the first switching mode is applied comprises:

the at least one of the source BWP and the target BWP carries fewer information than the BWP to which the first switching mode is applied.

15. The method of claim 10, further comprising:

sending first trigger information to the terminal device, and the first trigger information being configured to trigger the terminal device to switch from the source BWP to the target BWP; wherein determining to use the second switching mode, the first trigger information is identical to or different from second trigger information, and the second trigger information is configured to trigger a switching from the target BWP to the source BWP.

16. The method of claim 15, wherein the target BWP carries a data transmission channel;

the first trigger information comprises DCI; and the second trigger information comprises a target trigger event, wherein the target trigger event is completion of transmission of the data transmission channel carried by the target BWP.

17. The method of claim 10, wherein an unfinished HARQ-ACK feedback or an unfinished non-scheduled transmission exists on the source BWP before switching using the second switching mode, the method further comprises:

determining completion of the terminal device switching using the second switching mode, receiving the unfinished HARQ-ACK feedback or the unfinished non-scheduled transmission on the target BWP.

18. The method of claim 17, further comprising:

determining that the switching delay when using the second switching mode for switching comprises a transmission occasion, suspending sending or receiving the HARQ-ACK feedback or the non-scheduled transmission at the transmission occasion.

19. A communication device, comprising: a transceiver, a memory and a processor connected to the transceiver and the memory respectively, wherein the processor is configured to control transmission and reception of radio signals of the transceiver by executing computer-executable instructions on the memory, and is capable of implementing the method for BWP switching of claim 10.

20. A communication device, comprising: a transceiver, a memory and a processor connected to the transceiver and the memory respectively, wherein the processor is configured to control transmission and reception of radio signals of the transceiver by executing computer-executable instructions on the memory, and is capable of implementing a method for BWP switching, the method comprising:

determining a target switching mode from a set of candidate switching modes, wherein the set of candidate switching modes comprises a first switching mode and a second switching mode;

switching from a source BWP to a target BWP using the target switching mode; wherein, a switching delay used by the first switching mode is longer than a switching delay used by the second switching mode;

wherein the source BWP and the target BWP to which the second switching mode is applied satisfy at least one limited condition;

wherein the at least one limited condition comprises: information carried by at least one of the source BWP or the target BWP to which the second switching mode is applied being different from information carried by a BWP to which the first switching mode is applied, wherein the information comprises at least one of a channel or a signal.

* * * * *